United States Patent [19]

Tiefenbacher et al.

[11] 4,212,890

[45] Jul. 15, 1980

[54] MANUFACTURE OF PELLETS FROM FEED MEALS

[75] Inventors: Hubert Tiefenbacher, Ludwigshafen; Friedrich Kraus, Mannheim; Guenther Matthias, Frankenthal, all of Fed. Rep. of Germany

[73] Assignee: BASF Aktiengesellschaft, Fed. Rep. of Germany

[21] Appl. No.: 919,772

[22] Filed: Jun. 28, 1978

[30] Foreign Application Priority Data

Jul. 2, 1977 [DE] Fed. Rep. of Germany ....... 2729917

[51] Int. Cl.$^2$ ................................................ A23K 1/22
[52] U.S. Cl. ........................................ 426/69; 426/623; 426/630; 426/454; 426/807
[58] Field of Search ............... 426/623, 630, 69, 72, 426/807, 454, 635, 335, 532; 260/96.5 C

[56] References Cited

U.S. PATENT DOCUMENTS

| 2,687,354 | 8/1954 | Gribbins | 426/69 |
|---|---|---|---|
| 3,573,924 | 4/1971 | Zarow | 426/69 |
| 3,619,200 | 11/1971 | Ferguson | 426/69 |
| 3,873,733 | 3/1975 | Moore | 426/69 |
| 3,939,280 | 2/1976 | Karnemaat | 426/69 |

*Primary Examiner*—R. B. Penland
*Attorney, Agent, or Firm*—Keil & Witherspoon

[57] ABSTRACT

Feed pellets are produced by homogeneously mixing feed meals with from 0.1 to 2% of a pulverulent urea-formaldehyde resin obtained by spray-drying a glue solution, and pelletizing the mixture.

3 Claims, No Drawings

MANUFACTURE OF PELLETS FROM FEED MEALS

The present invention relates to a process for the manufacture of feed pellets, ie. extrudates, by homogeneously mixing the feed with from 0.1 to 2% by weight of a pulverulent urea-formaldehyde resin and then pelletizing the mixture.

The manufacture of pellets, ie. cylindrical extrudates or extrudates of non-circular cross-sections, having, for example, a diameter of from 1 to 20 mm and a length of, for example, from 2 to 50 mm, and of briquets, from feed meals, especially mixed feeds, is a widely used method of imparting advantageous properties to a feed, eg. preventing the demixing of the components, achieving lower storage costs and lower transport costs due to higher density, achieving better metering due to good flowability, thereby making the feed particularly suitable for non-manual feeding, reducing the losses of feed, reducing, due to the lower specific surface area, the sensitivity to changes caused by air and light, and achieving better feed utilization by the animal as a result of the chemical changes (digestion) of the feed during pelletizing.

However, the manufacture of pellets is a complicated technical process and the problems which it raises have not yet been solved satisfactorily. In fact, the following must be avoided during pelletizing:

A high temperature, which damages nutrients and vitamins. However, a high temperature is generated by the necessary introduction of steam into the mixed feed before pelletizing, and as a result of friction when the mixture is forced through the dies;

excessive expenditure of energy during pelletizing, since very hard pellets are not eaten by the animal, and since the die wears excessively;

dust formation (resulting in pollution of the environment, and in technical effort required to remove the dust from the shop floor);

losses of feed;

excessively easy abrasion of the pellets, due to insufficient energy applied during pelletizing, resulting in insufficient compression; and insufficient bonding of the particles, particularly in the case of coarse raw materials and at high fat contents, resulting in crumbling of the pellets.

These disadvantages and problems, which occur to greatly varying degrees, are very difficult to solve. The success achieved depends on a plurality of known and unknown parameters which cannot always be identified. Attempts have been made to solve these problems in different ways: in part, by apparatus means, ie. by varying the physical or technical parameters, in part by personal skill of the operators and of the pelletizer supervisor, and in part by using pelletizing assistants.

Pelletizing assistants have diverse effects and accordingly they have to meet a number of different requirements:

(a) A lubricating or slip-producing action, so that the feed meal can be pelletized more easily and with less energy.

(b) A binding action, so that the small particles agglomerate better. The intention is that the pellets should be abrasion-resistant, but not brittle. If they become brittle and non-resilient, they break during transport and storage.

(c) No effect on the flavor, since the animals will otherwise refuse the feed.

(d) Physiological harmlessness to both animals and man.

(e) Compatibility with all components of the feed.

(f) Effectiveness even at low concentrations.

(g) Resistance to microbial attack, and non-introduction of microbial contamination into the feed through the assistant.

(h) Heat resistance, so that the assistant withstands the heat generated during pelletizing.

A plurality of pelletizing assistants which conform to these requirements have been disclosed. For example, the German Feedstuffs Law permits the following:

1. Ligninsulfonate in an amount of up to 30 g per kg of feed
2. Bolus alba in an amount of up to 30 g per kg of feed
3. Cellulose ethers (=carboxymethylcellulose) in an amount of up to 3 g per kg of feed.

Ligninsulfonate is in the main used as a pelletizing assistant for mixed feed. It has the disadvantage that, depending on the formulation, from 1.5 to 10% are needed, and in most cases this must also be combined with molasses. However, a high content of molasses precludes the use of a high temperature, since they caramelize. The relatively high concentration of ligninsulfonate which is required dilutes the feed and thereby reduces its nutrient content. This can only be compensated by using high-energy feeds which, however, are more expensive. Furthermore, ballast materials such as ligninsulfonate slow down resorption. Finally, ligninsulfonate always contains sulfur dioxide, which has a laxative effect.

Bolus alba also has the disadvantage that it dilutes the feed and reduces the nutrient concentration. Furthermore, it has only a slight agglomerating action. As a result, the pellets have poor abrasion resistance. In respect of its binding action, white clay is inferior to ligninsulfonate.

Cellulose ethers, eg. in the form of carboxymethylcellulose, are only used in special feeds, because of the relatively high price of the ether. This binder however also suffers from the technical disadvantage that it insufficiently binds high fat contents in the feed.

It is an object of the present invention to provide a process for the manufacture of feed pellets which do not suffer from the above disadvantages.

We have found that this object is achieved, according to the invention, by homogeneously mixing the feed meal to be pelletized with from 0.1 to 2% by weight, preferably from 0.15 to 1.5% by weight, based on the feed, of a pulverulent urea-formaldehyde resin containing at most 2% by weight of water, based on the resin, and then extruding the mixture. Preferably, the feed mixture is first heated, in particular with steam.

The pelletizing process of the invention may be used for all meal single feeds and in particular for meal mixed feeds.

Mixed feeds are mixtures of vegetable, animal and synthetic organic and inorganic materials, eg. flour, ground soybeans, fish meal, mineral substances, eg. monocalcium phosphate and dicalcium phosphate, trace elements in the form of magnesium oxide and copper sulfate, and vitamins, eg. vitamin A acetate and vitamin E acetate.

Suitable pulverulent urea-formaldehyde resins are resins which are prepared, in the manner conventionally used to manufacture glues, in the form of an about 50% strength aqueous solution (viscosity from 80 to 120 milliPascalseconds at 20° C., molar ratio urea:formaldehyde=from 1:1.95 to 1:2.05), which is dried at from 100° to 170° C., for example by spray-drying, to give a product which contains at most 2% by weight of water. Advantageously, a urea:formaldehyde ratio of from 1:1.6 to 1:2 is used. In contrast to the requirements a wood glue has to meet, the present powder can, and even should, have a relatively high content of free formaldehyde, eg. from 1 to 4% by weight, especially from 1.4 to 3% by weight and preferably from 1.6 to 2.4% by weight. In fact, it has been found that the higher the free formaldehyde content in the resin is, the higher is the abrasion resistance of the pellets. (The free formaldehyde content is determined by conventional methods, eg. suspending the powder in ethylene glycol and determining the free formaldehyde by the method of De Jong described by De Jong et al., Rec. Trav. Chim. Pays-bas 71 (1952), 643).

The free formaldahyde has the further advantage that it is bonded by proteins, which thereby protected from premature digestion in the rumen and pass, undigested, into the abomasum and/or small intestine. Further, formaldehyde acts as a preservative for the feed. It does not interfere with the flavor and the feed retains a pleasant odor.

For details of the manufacture of the resins, reference may be made to Ullmanns Encyklopädie der technischen Chemie, 12, pp. 406 and 412–415 (4th edition), 1976).

From 0.1 to 2% by weight of the urea-formaldehyde resins are mixed with the feed meal. A distinct lubricating and solidifying effect is observed when using amounts exceeding 0.1% by weight; this effect first increases, but at above 2% by weight shows only slight further intensification. The upper limit on the amount added is thus foremost imposed by economic considerations. For this reason, amounts of from 0.15 to 1.5%, preferably from 0.2 to 0.5% by weight, are generally used.

The urea-formaldehyde resin and the feed can advantageously be mixed in conventional mixers, eg. centrifugal mixers, screw mixers, twin screw mixers, fluidizer mixers, horizontal mixers, vertical mixers, batch mixers or continuous mixers, until homogeneous distribution is achieved. After treating the resulting mixture with a liquid and/or with steam, it is forced through dies, in accordance with the selected method of pelletizing, to give pellets which are chopped to the desired length, eg. from 2 to 50 mm. Details of the presses and pelletizing process may be found in "Feed Manufacturing Technology" (American Feed Manufacturers Association, Feed Production Council) 1970, published by American Feed Manufacturers Association Inc., 53 West Jackson Boulevard, Chicago, Illinois 60604, pages 96 et seq. and 385 et seq.

Using the process according to the invention, less energy need be expended during pelletizing, and the pellets obtained exhibit less abrasion, great resilience and a smooth surface, thus affording protection against infection by molds or bacteria.

In addition, the pellets obtainable according to the invention have a certain porosity, so that the density is from 20 to 25% less than in the absence of added resin. It is true that this in part cancels out the advantage of less expenditure on packaging and of lower transport volume, but this porosity has a very advantageous effect in feeding, as described below.

In pig rations, the increase in volume results in the pigs no longer over-eating, since the increased volume fills the stomach sooner. The feed is also better salivated, since it disintegrates into smaller particles on chewing. Both result in a longer residence time in the intestine and in better utilization, as well as in better pre-digestion by the saliva, and hence better overall digestion. The improved feed utilization results in greater feed efficiency. In the case of fish food, the buoyancy is improved, and pond contamination is thereby substantially reduced.

The advantageous properties of the pelletized feed achieved by adding the urea-formaldehyde resin, and the effectiveness of small amounts of the resin are surprising though the adhesive action of urea-formaldehyde resins is well-known from their use as wood glues. In fact, the totality of the above improvements achieved in mixed feeds cannot be explained on the basis of experience gathered in using the resin as a wood glue. The addition of large amounts of rye flour or starch paste (ie. of carbohydrates such as are present in the feeds) is known to have a lasting effect on adhesion and hardening takes place relatively slowly, which is why the pellets according to the invention would have been expected to stick together; furthermore, relatively brittle pellets would have been expected.

German Laid-Open Application DOS No. 1,927,971 has already disclosed the addition of urea-formaldehyde resins to feeds. The present invention differs essentially from the above publication in respect of the measures taken, the object to be achieved and the results obtained. In the above publication, a particulate, ie. non-meal, feed is first treated with an amide, heated and dried, a liquid concentrated urea-formaldehyde condensate is then applied and the feed is pelletized. In the sole relevant Example, orange plup is treated with urea and then reacted with a condensate which has a molar ratio of formaldehyde:urea of 4.6:1. The amount of condensate is 12.5% by weight, and is thus substantially higher than in the process of the present invention.

EXAMPLE 1

Pig fattening rations 5,000 kg of pig fattening rations are mixed with 1% by weight of urea-formaldehyde condensate powder and the mixture is pelletized. The ration has the following composition:
15% of barley
9% of milo
8% of wheat
7% of Indian corn
25% of wheat bran
3% of ground corn germ
1.5% of malt germ
10% of soybean meal cake
10% of tapioca flour
2% of rape seed meal
0.5% of fish meal
2.5% of carcass meal
1% of bone meal
3% of molasses
1% of feed fats
Remainder: vitamins, mineral substances and trace elements.

The pellets exhibit a hardness of 10.44 kg/cm$^2$ and an abrasion of 1.42%. The pelletizer output is as high as in a comparative experiment without urea-formaldehyde condensate.

The urea-formaldehyde condensate is prepared as follows. An aqueous solution, of 50% solids content, of a urea-formaldehyde condensation product, obtained in the conventional manner by acid condensation of an aqueous solution of urea and formaldehyde is evaporated in a spray dryer 100°–170° C. to give a powder. The molar ratio of urea to formaldehyde is 1:1.9. The powder contains 1.5% of water. The free formaldehyde content is 30% and decreases to 2% after 1 week. The tap density is 0.7 kg/l. The particle size distribution is as follows:
100% less than 0.2 mm
90% less than 0.1 mm
30% less than 0.05 mm

COMPARATIVE EXPERIMENT 5,000 kg of a pig fattening ration having the above composition, are pelletized without adding a urea-formaldehyde condensate. The pellets exhibit a hardness of only 8.34 kg/cm$^2$, and an abrasion of 3.40%, which is 2.4 times that of the pellets manufactured according to the invention.

The abrasion is determined as follows:

The pellets are filled into a rotating box which is revolved 500 times at the rate of 50 revolutions per minute. The pellets are then screened. The material passing through the screen, ie. the material of smaller diameter than an entire pellet, is classified as the abrasion.

EXAMPLE 2

Carp food 5,000 kg of a carp food together with 1% of a urea-formaldehyde condensate powder of the same composition as that described in Example 1 are pelletized. The carp food has the following composition:
13% of barley
9% of milo
8% of wheat
12% of Indian corn
20.5% of wheat bran
3% of ground corn germ
1.5% of malt germ
10% of soybean meal cake
2% rape seed meal
5% of tapioca flour
5% of fish meal
2.5% of carcass meal
3% of bone meal
3% of molasses
1% of feed fats
remainder: vitamins, mineral substances and trace elements.

The pellets exhibit a hardness of 10.1 kg/cm$^2$ and an abrasion of 1.51%. After being left under water for 12 hours, the pellets prove to have retained their shape and not to have dissolved. This is surprising since urea-formaldehyde glue is water-soluble and a bonding action at the above concentration was previously unknown.

COMPARTIVE EXPERIMENT 5,000 kg of a carp food of the above composition are pelletized without adding urea-formaldehyde condensate. The pellets have a hardness of only 8.2 kg/cm$^2$ and exhibit 3.4% abrasion. They dissolve completely in water after 4 minutes. The constituents spread through the fish tank.

EXAMPLE 3

Carp food 1,000 kg of a carp food of the following composition
32% of Indian corn
25.68% of soybean meal cake
12% of wheat
5% of oats
5% of milo
5% of fish meal
3.50% of wheat middlings
2.5% of feed fats
2.0% of calcium hydrogen-phosphate
1.5% of lime stone meal
1.0% of bone meal
1.0% of dried yeast
1.0% of brewers' grains dried
1.0% of sugarbeet chips
0.7% of vitamin permix
0.62% of a premix of coccidiostatic agents
0.20% of a trace element permix
0.20% of antibiotic premix
0.10% of iodized salt
are mixed with 5 kg of urea-formaldehyde condensate powder (=0.5%) (prepared as described in Example 1) and the mixture is pelletized. The pellets remain stable in water for 3 days, after which they disintegrate. 10 carp, which at the beginning of the experiments weighed from 10 to 20 g, are fed with this mixture for 61 days. The tank used is a test aquarium having a surface area 60×30 cm and a height of 40 cm. The aquarium contains 60 l of chlorine-free tap water. The water is circulated, passing through a carbon filter. The temperature is from 20° to 22° C. The 10 carp receive 3 g of food per day. The weight increase per animal per day is 0.46 g.

An experiment carried out as described above but without adding urea-formaldehyde condensate gives pellets which remain stable for only 1–2 days. The weight increase per animal per day is 0.28 g.

An experiment carried out as described above, but with the addition of 2% of urea-formaldehyde condensate, gives pellets which remain stable for from 3 to 10 days. The weight increase is 0.31 g per animal per day.

EXAMPLE 4

Pig fattening rations 4,000 kg of pig fattening rations of the following composition
15% of Indian corn
20% of barley
10% of tapioca
10.5% of soybeans
8% of wheat middlings
4.5% of wheat middlings, second quality
10% of byproducts from the manufacture of corn oil
3% of ground rape
7% of corn germ
3% of dry chips from sugar beets after the sugar has been extracted
3% of molasses
2% of bone meal
0.5% of fish meal
1.5% of fat
remainder: vitamins and trace elements
are mixed with 0.25% of a urea-formaldehyde condensate powder and mixture is pelletized. The temperature is 74° C. at the pelletizer inlet and 80° C. at the outlet, and the temperature of the cooler is 16° C. After cooling, the water content of the mixture is 14.6% (as a result of the addition of steam). The abrasion was found to be 4%.

COMPARATIVE EXPERIMENT

In a batch treated similarly, sufficient ligninsulfonate is added (by trial and error) to give the same abrasion. The content of ligninsulfonate is 1.6%, ie. 6 times the amount required in the case of the urea-formaldehyde condensate.

We claim:

1. A process for the manufacture of pellets of feed meals, comprising:
mixing feed meals, which have not been pretreated with urea, homogeneously with from 0.1 to 2% by weight of a pulverulent urea-formaldehyde resin obtaned by spray-drying a urea-formaldehyde solution said urea-formaldehyde resin having a molar ratio of urea to formaldehyde of from 1:1.6 to 1:2 and having a free formaldehyde content from 1 to 4% by weight with reference to the urea-formaldehyde resin, said free formaldehyde being included in said molar ratio, and without further addition of urea pelletizing the mixture.

2. A process as claimed in claim 1, wherein from 0.15 to 1.5% by weight of the urea-formaldehyde resin is added.

3. A process as claimed in claim 1, wherein the feed meals are heated prior to pelletizing.

* * * * *